United States Patent
Lu et al.

(10) Patent No.: US 9,032,107 B2
(45) Date of Patent: May 12, 2015

(54) USB KEY AND A METHOD FOR COMMUNICATION BETWEEN THE USB KEY AND A TERMINAL

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 113 days.

(21) Appl. No.: 13/824,443

(22) PCT Filed: Sep. 25, 2012

(86) PCT No.: PCT/CN2012/081904
§ 371 (c)(1),
(2) Date: Mar. 18, 2013

(87) PCT Pub. No.: WO2013/075546
PCT Pub. Date: May 30, 2013

(65) Prior Publication Data
US 2014/0201395 A1    Jul. 17, 2014

(30) Foreign Application Priority Data
Nov. 22, 2011 (CN) .......................... 2011 1 0374579

(51) Int. Cl.
| G06F 21/44 | (2013.01) |
| G06F 13/38 | (2006.01) |
| G06F 1/26 | (2006.01) |
| G06F 13/10 | (2006.01) |

(52) U.S. Cl.
CPC .............. *G06F 21/44* (2013.01); *G06F 13/385* (2013.01); *G06F 1/26* (2013.01); *G06F 13/10* (2013.01); *Y04S 40/24* (2013.01)

(58) Field of Classification Search
None
See application file for complete search history.

(56) References Cited

U.S. PATENT DOCUMENTS

| 8,504,820 B2 * | 8/2013 | Lu et al. ........................ 713/151 |
| 2005/0021895 A1 * | 1/2005 | Son et al. ...................... 710/301 |
| 2005/0264472 A1 * | 12/2005 | Rast ................................ 345/30 |
| 2006/0061795 A1 * | 3/2006 | Walmsley .................... 358/1.14 |
| 2006/0129806 A1 * | 6/2006 | Walmsley ..................... 713/161 |
| 2008/0055370 A1 * | 3/2008 | Sakamoto et al. .............. 347/70 |
| 2009/0182935 A1 * | 7/2009 | Pizzarulli et al. ............. 711/103 |
| 2009/0248907 A1 * | 10/2009 | Huang et al. .................... 710/10 |
| 2011/0035515 A1 * | 2/2011 | Quach et al. .................... 710/38 |
| 2011/0113251 A1 * | 5/2011 | Lu et al. ........................ 713/172 |
| 2012/0054372 A1 * | 3/2012 | Chen et al. ...................... 710/13 |
| 2013/0031277 A1 * | 1/2013 | Lu et al. ......................... 710/10 |

* cited by examiner

*Primary Examiner* — Henry Tsai
*Assistant Examiner* — Aurangzeb Hassan
(74) *Attorney, Agent, or Firm* — Hammer & Associates, P.C.

(57) ABSTRACT

A key has a micro-control unit (MCU) module for detecting a pattern of a MCU module pin in a potential state. An Universal serial bus (USB) is fixedly connected with an interface module of a terminal. The MCU module is connected with the USB when a predetermined condition is satisfied. An enumeration request is sent to the terminal. The terminal is connected with the interface module. A mode pin is utilized for indicating a communication mode between the USB and the terminal in the potential state.

12 Claims, 7 Drawing Sheets

USB KEY AND A METHOD FOR COMMUNICATION BETWEEN THE USB KEY AND A TERMINAL

TECHNICAL FIELD

The present invention relates to information security field, and in particularly, relates to a USB Key and a method for communication between the USB Key and a terminal.

PRIOR ART

For the time being, the USB Key has been widely applied in circumstance requesting for identity authentication, such as online bank, e-business, etc.

A general USB Key can only communicate via a single USB interface or a complex USB interface, but does not support a terminal conforming to a serial interface protocol.

There has not provided a solution for solving the shortcoming of a general USB Key in a process of communication in the prior art.

SUMMARY OF THE INVENTION

The object of the present invention is to provide a USB Key and a method for communication between the USB Key and a terminal, in which the USB Key is compatible with a USB interface and a serial interface, and can be used both on a terminal with a USB interface and a terminal with a serial interface.

Thus, the present invention provides a universal serial bus line USB Key, wherein said USB key comprises an interface module, a power module and a micro control unit (MCU) module, in which the interface module is configured to configured to connect with a terminal;

the power module is configured to supply power to the MCU module in case that the interface module is connected with the terminal; and the MCU module is configured to perform initialization setting after power on, and detect a power level status of a mode pin inside the MCU module, in case that the power level status conforms to a first predetermined condition, set a pin for serial interface communication in the MCU module to a high impedance state, configure a USB function, receive a request for enumerating a device being sent from the terminal connecting to the interface module, and perform USB communication with the terminal after enumeration; while, in case that the power level status conforms to a second predetermined condition, set a pin for USB communication in the MCU module to a high impedance state, configure a serial interface function, send a request for enumerating a device to the terminal connecting to the interface module, and perform a serial interface communication with the terminal after enumeration, in which the mode pin is configured to indicate a communication mode between the USB Key and the terminal by the power level status of the mode pin itself.

On the other hand, the present invention also provides a method for communication between a universal serial bus line USB Key and a terminal, wherein said method comprises such steps that the USB Key powers up and performs initialization setting;

the USB Key detects power level of a mode pin in a microcontrol unit (MCU) module of the USB Key itself, in which the mode pin is configured to indicate communication mode between the USB Key and the terminal by power level of the mode pin itself;

if the power level of the mode pin conforms to a first predetermined condition, the USB Key sets a pin for serial-interface communication in the MCU module to a high impedance state, configures a USB function, receives a request for enumerating a device being initiated by the terminal connecting to the USB Key, and after enumeration, performs the USB communication with the terminal; and if the power level of the mode pin conforms to a second predetermined condition, the USB Key sets a pin for USB communication in the MCU module to a high impedance state, configures a serial-interface function, sends a request for enumerating the device to the terminal connecting to the USB Key, and performs the serial-interface communication with the terminal after enumeration;

The present invention has such advantages that a USB Key becomes compatible with a USB interface and a serial interface, and the USB Key can be used on both a terminal with a USB interface and a terminal with a serial interface.

DESCRIPTION OF THE DRAWINGS OF THE INVENTION

DETAILED EMBODIMENTS OF THE INVENTION

Below is a detailed description of the technical solution in Embodiments of the invention in accompanying with the drawings of the invention, and obviously Embodiments described are just part but not all embodiments, all other embodiments obtained by those skilled in the art without involving any inventive step should fall within the scope of protection of the invention.

Embodiment 1

Embodiment 1 of the invention provides a USB Key, in which a complex application of a serial interface and a USB interface is accomplished.

Figure 1:
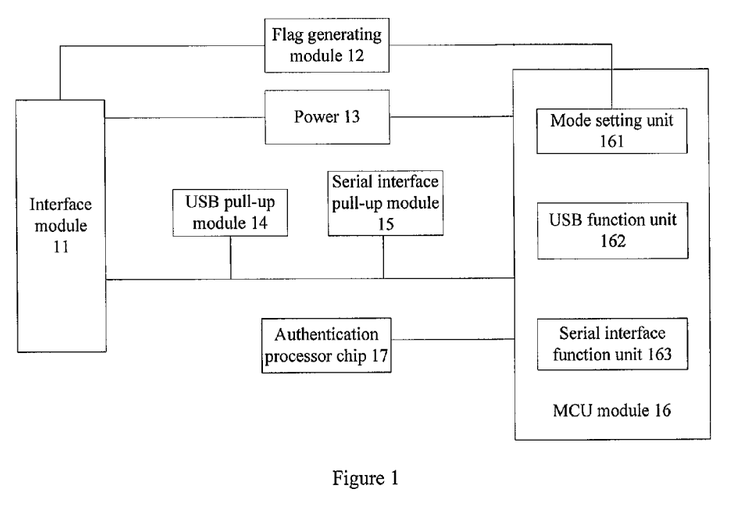
FIG. 1 illustrates a chart of functional modules inside a USB Key provided by Embodiment 1 of the invention.

As illustrated in FIG. 1, modules inside the USB Key include an interface module 11, a flag generating module 12, a power module 13, a USB pull-up module 14, a serial interface pull-up module 15, a MCU module 16, and an authentication processor chip 17.

Functions of the modules are set forth as below.

The interface module 11 is for acting as a USB interface and a serial interface.

The flag generating module 12, which connects the interface module 11 and a mode setting unit 161, is configured to generate a level flag of a mode pin inside of the MCU.

The power module 13, which connects the interface module 11 and the MCU module 16, is configured to send the power signal being generated by the interface module 11 to the MCU module 16 in case that the interface module 11 connects to a terminal.

The USB pull-up module 14, which connects the interface module 11 and the MCU module 16, is controlled to be pulled up validly or invalidly by a power signal being generated by the interface module 11 or by an output signal from the MCU module 16.

The serial interface pull-up module 15, which connects the interface module 11 and the MCU module 16, is controlled to be pulled up validly or invalidly by the power signal being generating by the interface module 11 or by the output signal from the MCU module 16.

The MCU module 16 is for controlling works of all modules, including a mode setting unit 161, a USB function unit 162, and a serial interface function unit 163.

The mode setting unit 161 is for setting a working mode for the MCU.

The USB function unit 162, which connects with the interface module 11, is for configuring and initializing USB function in case that the working mode being set by the mode setting unit 161 is a USB working mode.

The USB function unit 162 is further for configuring the RXD pin and TXD pin in case that the USB pull-up module 14 is pulled up validly.

Specifically, in Embodiment 1, both the RXD pin and the TXD pin are set to high impedance state when the USB pull-up module 14 is pulled up validly.

The USB function unit 162 is further for receiving a request for enumerating the device initiated by the USB terminal connecting with the Key and after enumeration, for performing USB communication between the Key and the USB terminal.

The serial interface function unit 163, which connects with the interface module 11, is for configuring and initializing the serial interface function when the mode setting unit 161 sets a serial interface working mode.

The serial interface function unit 163 is further for configuring the D+ pin, D− pin, RXD pin and TXD pin when the serial interface pull-up module 15 is pulled up validly.

Specifically, in Embodiment 1, when the serial interface pull-up module 15 is pulled up validly, the serial interface function unit 163 is for setting the D+ pin and D− pin to high impedance state, setting the Port TXD to be an outputting port and setting the port RXD to be an inputting port.

The serial interface function unit 163 is further for the Key to initiate a request for enumerating the device to the serial-interface terminal connecting with the Key, and after enumeration, the Key performs a serial interface communication with the serial interface terminal.

The authentication processor chip 17, which connects with the serial-interface function unit 163, is for exchanging data with the serial interface function unit 163 in the MCU module 16 and processing the data, so as to complete the enumeration in case that the mode setting unit 161 sets a serial interface working mode.

Embodiment 2

Based on the USB Key provided by Embodiment 1, Embodiment 2 provides a method for communication between the USB Key and a terminal. In the method, an MINI-USB interface is configured as an interface of the Key, which combines functions of a USB interface and a serial interface.

Figure 2:
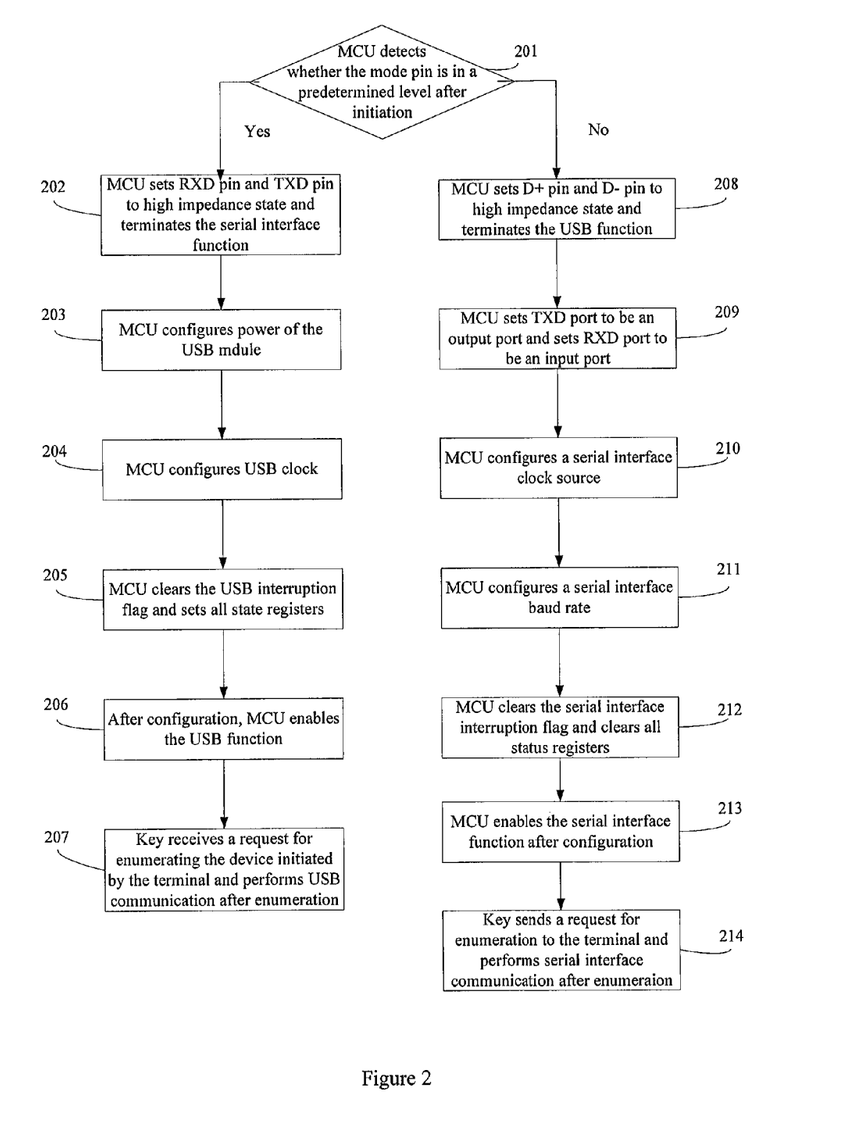
FIG. 2 illustrates a flow chart of a method for communication between the USB Key and a terminal provided by Embodiment 2 of the invention.

As illustrated in FIG. 2, after power on, MCU inside the Key executes the following steps.

Step 201, after initialization configuration, the MCU detects whether level of the mode pin is a predetermined level, if yes, Step 202 is executed; if no, Step 208 is executed.

Specially, the level of the mode pin is generated by the flag generating module in Embodiment 1.

Figure 3:
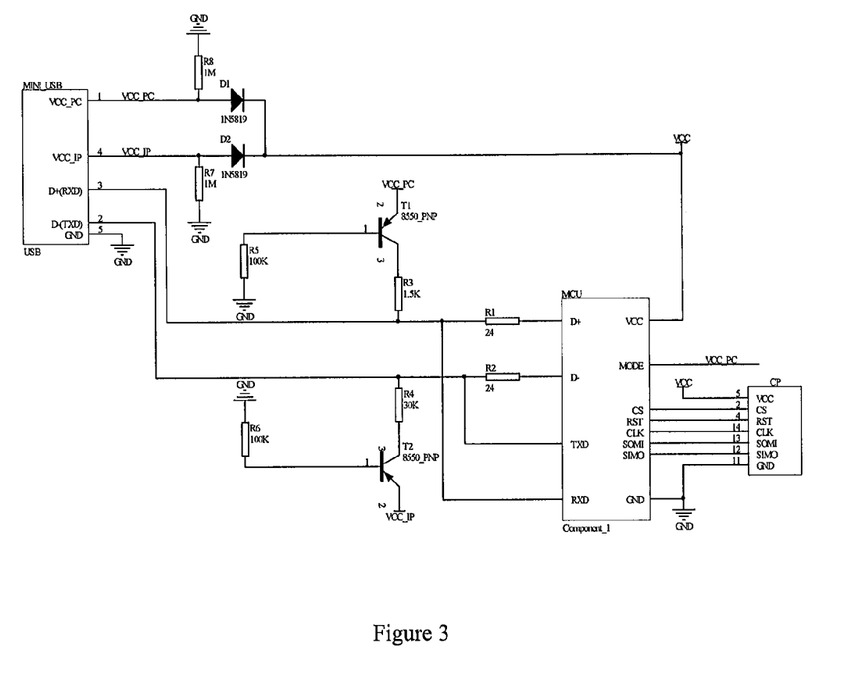
FIG. 3 illustrates an electric circuit diagram inside the USB Key provided by Embodiment 2 of the invention.

Preferably, in Embodiment 2, as illustrated in FIG. 3, if the mode pin connects to the pin VCC-PCC on the MINI-USB interface, the predetermined level is high level.

If the mode pin connects to the pin VCC-IP on the MINI-USB interface, the predetermined level is low level.

The flag generating module is accomplished by a connection between the mode pin on MCU and Pin VCC-PC on the MINI-USB interface.

Specifically, if Pin VCC-PC is valid, the mode pin is in high level, while if Pin VCC-PC is invalid, the mode pin is in low level.

Or, the flag generating module also can be accomplished by connection between the mode pin on MCU and Pin VCC-IP on the MINI-USB interface.

Specifically, if Pin VCC-PC is valid, the mode pin is in high level, while if the pin VCC-PC is invalid, the mode pin is in low level.

At the same time, MCU gets power signal via the power module in Embodiment 1, preferably as illustrated in the electric circuit diagram of FIG. 3, the power module is comprised of a diode D1, a pull-down resistor R8, a diode D2 and a pull-down resistor R7.

Specifically, if the mode pin is in high level, viz., the pin VCC-PC at the interface MINI-USB is in high level, the diode D1 connecting the pin VCC-PC is conducted, and starts to supply power to MCU.

If the mode pin is in low level status, viz., the pin VCC-PC at the interface MINI-USB is in low level status, the diode D2 connecting the VCC-IP pin is conducted, and starts to supply power to MCU.

At the same time, in Embodiment, the signal line D+ being pulled up for high level is completed by the USB pull-up module in Embodiment 1.

Preferably, as illustrated in the electric circuit diagram of FIG. 3, the USB pull-up module is comprised of a triode T1, a pull-up resistor R3, and a pin VCC-PC of the flag generating module.

Specifically, if the mode pin is in high level viz., the pin VCC-PC at the interface MINI-USB is in high level, voltage of an emitter of the triode T1 is VCC-PC, and base of the triode T1 is pulled down for low level, therefore the triode T1 is conducted, and then the pull-up resistor R3 of the signal line D+ is valid which makes the signal line D+ is in high level.

At the same time, in Embodiment 2, preventing the pin TXD from leakage is completed by the serial interface pull-up module in Embodiment 1.

Preferably as illustrated in the electric circuit diagram of FIG. 3, the serial interface pull-up module is comprised of a triode T2, a pull-up resistor R4, and VCC-IP.

Specifically, if the mode pin is in low level viz., the pin VCC-IP at MINI-USB interface is in high level, the emitter voltage of the triode T2 is VCC-IP, base of the triode T2 is pulled down for low level by the resistor R6, therefore the triode T2 is conducted, and then the pull-up resistor of the TXD signal line is valid which prevents leakage at the TXD pin.

Step 202, MCU sets the pin RXD and the pin TXD to high impedance state, and terminates the serial-interface function inside MCU.

In Embodiment 2, port controlled by the pull-up resistor of the pin TXD will be set to high impedance state.

Step 203, MCU configures power supply of the USB module.

Preferably, in Embodiment 2, MCU applies a built-in voltage-stabilized source to supply power to the USB module, in which the built-in voltage-stabilized source is with an output voltage of 3.3v.

Step 204, MCU configures a USB clock.

Step 205, MCU clears a USB interruption flag, and resets all kinds of state registers.

Step 206, after configuration, MCU initiates the USB function.

Step 207, the Key receives the request for enumerating the device being initiated by the terminal, and upon enumeration, performs USB communication.

Specifically, in Embodiment 2, enumeration between the Key and the terminal includes following steps.

Step 207-1, upon receiving a restart signal, the Key starts the enumeration.

Specifically, upon receiving the restart signal, the Key is ready for response to a control transfer with a default process of Port 0 viz., the Key communicates with the terminal with a default address 0×0.

Step 207-2, upon receiving the instruction Get_Device_Descriptor being sent from the terminal, the Key sends a device descriptor to the terminal.

Specifically, in Embodiment 2, the field bMaxPacketSize0 in the device descriptor includes the maximum data packet length, and offset of the maximum data packet length is 7, and therefore the maximum data packet length can be obtained by reading the first 8 bytes of the device descriptor by the terminal.

Step 207-3, upon receiving a request Set_Address being sent from the terminal, the Key returns a confirmation instruction.

Specifically, in Embodiment 2, the terminal allocates a unique address to Key by sending a request Set_Address, and upon receiving the request, the Key returns a confirmation instruction and stores the new address as an address to be used in the following communication.

Step 207-4, upon receiving the instruction Get_Device_Descriptor being sent from the terminal again, the Key sends the device descriptor to the terminal.

Specifically, in Embodiment 2, for this time, the terminal needs to read all fields of the device descriptor so as to appreciate summary information of Key, such as VID and PID.

Step 207-5, upon receiving the instruction Get_Device_Configuration being sent from the terminal, the Key sends configuration information to the terminal.

In Embodiment 2, upon receiving the instruction Get_Device_Configuration being sent from the terminal, the Key returns a corresponding response instruction.

The response instruction includes all configuration information of the Key.

Step 207-6, upon receiving the instruction Get_Device_String being sent from the terminal, the Key returns a character-set descriptor to the terminal.

Preferably, in Embodiment 2, the character-set descriptor comprises manufacturer, product description, and type etc., Step 207-7, upon receiving the instruction Set_Configuration(x), the Key writes the configuration value x into the register and returns a confirmation instruction.

Specifically, in Embodiment 2, upon loading a Key driver, the terminal sends an instruction Set_Configuration(x) to the Key viz., the terminal selects an appropriate configuration for the Key, in which x refers to a non-zero configuration value.

At this time, the Key completes the necessary configuration and connection, therefore when looking up a registry, the Key finds that the corresponding item has been added, and then it can communicate with the terminal.

Step 208, MCU sets the pin D+ and the pin D− to high impedance state, and terminates the USB function inside of it.

Specifically, in Embodiment 2, if there is an port controlled by D+ pull-up, D+ can be set to be high impedance state.

Step 209, MCU sets Port TXD to be an Output port, and sets Port RXD to be an Input port.

Specifically, the pull-up resistor on the signal line TXD is optional, and if there is a pull-up resistor inside of MCU, it only needs to configure Port TXD to be an inside pull-up state.

Step 210, MCU configures a clock source for the serial interface.

Step 211, MCU configures a baud rate for the serial interface.

Step 212, MCU clears the Interrupt flag for the serial interface, and resets all kinds of state registers.

Step 213, after configuration, MCU initiates serial interface function.

Step 214, the Key sends a request for enumerating the device to the terminal, and after enumeration, performs serial interface communication with the terminal.

Specifically, before the serial interface communication, the Key performs mutual authentication with the terminal viz., the Key accepts first signature authentication by the terminal and performs second signature authentication on the terminal, which includes following steps.

Step 214-1, the Key reports its device features to the terminal so as to initiate a process of registering the Key in the terminal.

Step 214-2, during registration, upon receiving the request for requesting for the signature certificate being sent from the terminal, the Key reads a first signature certificate from its inside authentication processor chip.

Step 214-3, the Key sends the first signature certificate to the terminal.

Step 214-4, the Key receives a first challenge code returned by the terminal.

Preferably, the first challenge code is a random number being generated by the terminal.

Step 214-5, the Key writes the first challenge code into the authentication processor chip, and sets a computing flag.

Step 214-6, first challenge code Key retrieves that a signature-having-been-generated flag being set, and reads a first signature value from the authentication processor chip.

Specifically, upon retrieving the computing flag being set by the Key, the authentication processor chip computes the first signature value, and sets the signature-having-been-generated flag.

Step 214-7, the Key sends the first signature value to the terminal, makes the terminal perform a first signature authentication on the first signature value with the first signature certificate, and returns an authentication result to the Key.

Step 214-8, after passing the first signature authentication, the Key completes registration on the terminal.

Step 214-9, after registration on the terminal, the Key sends a request for requesting for a signature certificate, and waits for receiving a second signature certificate being sent from the terminal.

Step 214-10, the Key receives a second signature certificate being sent from the terminal, and writes the second signature certificate into the authentication processor chip.

Step 214-11, the Key reads a second challenge code from the authentication processor chip, and sends the second challenge code to the terminal.

Preferably, the second challenge code is a random number being generated by the authentication processor chip.

Step 214-12, the Key receives a second signature value sent from the terminal.

Step 214-13, the Key writes the second signature value into the authentication processor chip, and sets the authentication flag.

Step 214-14, the Key retrieves the successful authentication flag being set by the authentication processor chip, and sends a result of the successful authentication to the terminal so as to complete the second signature authentication of the terminal.

Specifically, in Embodiment 2, the authentication processor chip retrieves the authentication flag being set by the Key, performs second signature authentication on the second signature value with the second signature certificate being sent from the terminal, if the authentication is successful, it sets the successful authentication flag; or if the authentication is failed, it returns to Step 214-9, and requests for authentication again.

After two times of successful authentication, the Key and the terminal start to communicate via the serial interface.

Figure 4:
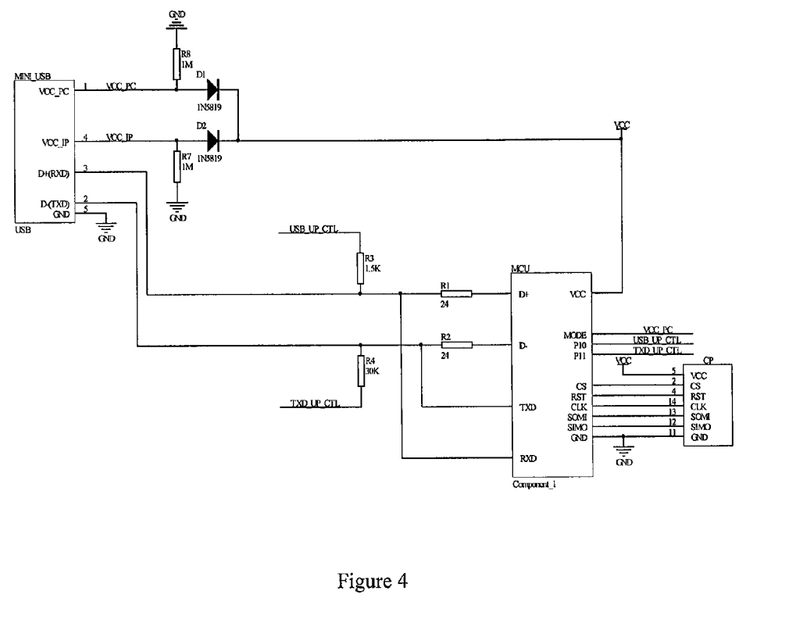
FIG. 4 illustrates another electric circuit diagram inside the USB Key provided by Embodiment 2 of the invention.

Specifically, the USB pull-up module and the serial-interface pull-up module inside the Key can be accomplished by another electric circuit as illustrated in FIG. 4.

The mode pin connects to the pin VCC-PC on the MINI-USB interface.

Both Pin P10 and Pin P11 on MCU are Output pins, in which Pin P10 connects to the pull-up resistor R3, and Pin P11 connects to the pull-up resistor R4. USB pull-up module controls the signal line D+ to be pulled up for high level or not via the output signal USB-UP-CTL from Pin P10 and the pull-up resistor R3; and the serial interface pull-up module controls the signal line TXD to be pulled up for high level or not via the output signal TXD-UP-CTL from the Pin P11 and the pull-up resistor R4.

Specifically, in Embodiment 2, the pull-up resistor on TXD signal line is optional, and if there is a pull-up resistor inside MCU, it only needs to set Port TXD to an inside pull-up state.

In the method, if the mode pin is pre-configured to high level, the output signal USB-UP-CTL on the Pin P10 is a high level, and the output signal TXD-UP-CTL on the Pin P11 is in a high impedance state, thus the pull-up resistor R3 is valid which enables D+ signal line to be in high level.

If the mode pin is in low level, the output signal TXD-UP-CTL on the Pin P11 is in a high level, and the output signal USB-UP-CTL on the Pin P10 is in a high impedance state, thus the pull-up resistor R4 is valid.

Embodiment 3

Embodiment 3 of the invention provides another USB Key, in which a serial interface and a USB interface are deployed, and thus the Key has functions of serial interface and USB interface.

Figure 5:
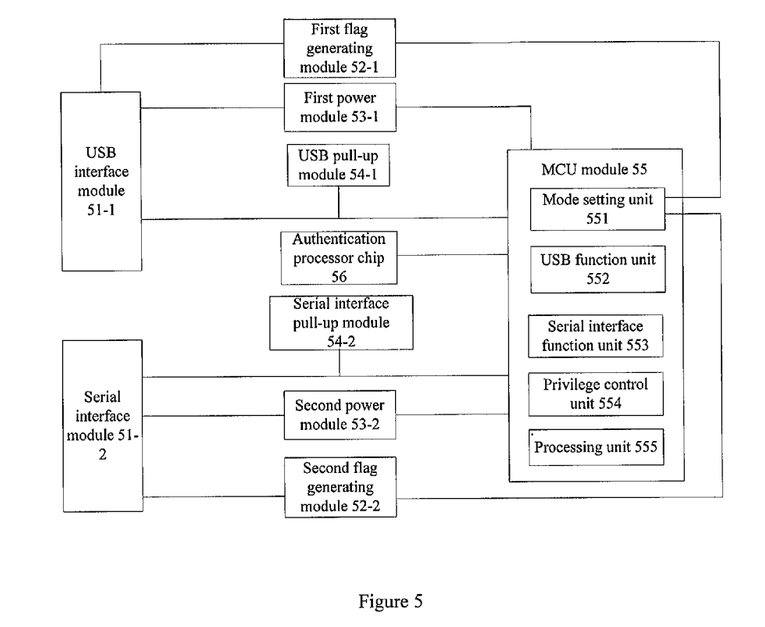
FIG. 5 illustrates another chart of functional modules inside a USB Key provided by Embodiment 3 of the invention.

As illustrated in FIG. 5, the functional modules inside the USB Key include a USB interface module 51-1, a first flag generating module 52-1, a first power module 53-1, a USB pull-up module 54-1, a serial interface module 51-2, a second flag generating module 52-2, a second power module 53-2, a serial interface pull-up module 54-2, an MCU module 55, and an authentication processor chip 56.

The above modules have functions as follows.

The USB interface module 51-1 functions as a USB interface.

The first flag generating module 52-1, which connects to the USB interface module 51-1 and a mode setting unit 561, is configured to generate a level flag for mode 0 pin on MCU.

The first power module 53-1, which connects to the USB interface module 51-1 and MCU module 55, is configured to transfer the power signal being generated by the USB interface module 51-1 to MCU module 55 in case that the USB interface connects to a terminal.

The USB pull-up module 54-1 connects to the USB interface module 51-1 and MCU module 55, and the power signal being generated at the USB interface module 51-1 or the output signal from MCU module 55 controls the USB pull-up module 54-1 to be pulled-up validly or invalidly.

The serial interface module 51-2 functions as a serial interface.

The second flag generating module 52-2, which connects to the serial-interface module 51-2 and the mode setting unit 551, is configured to generate a level flag for model pin inside MCU.

The second power module 53-2, which connects to the serial interface module 51-2 and MCU module 55, is configured to transfer the power signal being generated by the serial interface module 51-2 to MCU module 55 in case that the serial interface connects to a terminal.

The serial interface pull-up module 54-2 connects to the serial interface module 51-2 and MCU module 55, which is controlled to be pulled up validly or invalidly by the power supply signal being generated by the serial interface module 51-2 or the output signal from MCU module 55.

The MCU module 55, including a mode setting unit 551, a USB function unit 552, a serial interface function unit 553, a privilege control unit 554 and a processing unit 555, is configured to control works of all modules.

The mode setting unit 551 is configured to set a working mode for MCU.

The USB function unit 552 is configured to configure and initiate a USB function in case that the mode setting unit 551 sets a USB working mode.

The USB function unit 552 is further for configuring Pin RXD and Pin TXD in case that the USB pull-up module 54-1 is pulled up validly.

Specifically, in Embodiment 3, if the USB pull-up module 54-1 is pulled up validly, Pin RXD and Pin TXD are set to high impedance state.

The USB function unit 552 is further configured to the Key to enumerate the terminal connecting to the Key via the USB interface module 51-1 and for the Key to perform USB communication with the terminal after enumeration.

The USB function unit 552 is further configured to set a status flag to be a first predetermined value upon receiving data being sent from the terminal connecting with the USB interface module 51-1.

The serial-interface function unit 553 is configured to set and enable the serial interface function in case that the mode setting unit 551 sets a serial interface working mode.

The serial-interface function unit 553 is also configured to configure Pin D+, Pin D−, Pin RXD and Pin TXD in case that the serial interface pull-up module 54-2 is pulled up validly.

Specifically in Embodiment 3, if the serial interface pull-up module 54-2 is pulled up validly, setting Pin D+ and Pin D− to high impedance state, setting Port TXD to be an output port, and setting Port RXD to be an input port.

The serial-interface function unit 553 is further configured to enumerate between the Key and the terminal connecting to it via the serial interface module 51-2, and for communication between the Key and the terminal via its serial interface after enumeration.

The serial-interface function unit 553 is further configured to set the status flag to be a second predetermine value after receiving the data being sent from the terminal connecting to the serial interface module 51-2.

The privilege control unit 554 is configured to set the communication privileges of all terminals connecting to the Key in case that the USB interface module 51-1 and the serial interface module 51-2 each connects to a terminal at the same time.

The processing unit 555 is configured to check for a status flag and value of the status flag is set by the USB function unit 552 or the serial interface function unit 553.

The processing unit 555 is further configured to execute corresponding operation according to the status flag being checked for, which includes that MCU communicates via its USB interface in case that the status flag being checked for is a first predetermined value, or MCU communicates via its serial interface in case that the status flag being checked for is a second predetermined value.

The authentication processor chip 56, which connects with MCU module 55, is configured to make data interaction and data processing with the serial interface function unit 553 inside MCU module 55 in order to complete enumeration.

Embodiment 4

Embodiment 4 of the invention provides another method for communication between the USB Key and the terminal, based on the USB Key provided by Embodiment 3. In the method, an MINI-USB interface and a serial interface are deployed on the Key.

Figure 6:
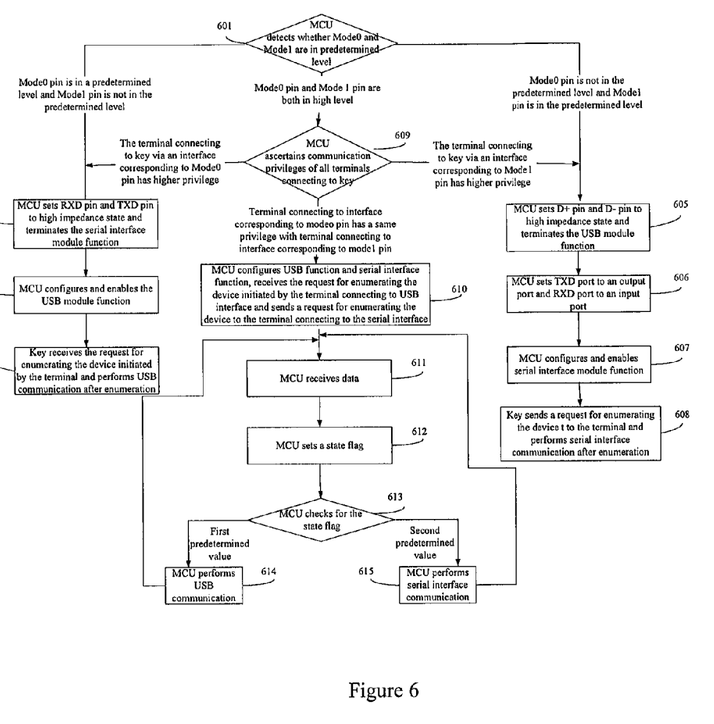
FIG. 6 illustrates another flow chart of the method for communication between the USB Key and a terminal provided by Embodiment 4 of the invention.

As illustrated in FIG. 6, after Key is powered up, MCU inside of it executes the following steps.

Step 601, after initialization setting, MCU detects whether mode0 pin, and mode1 pin are in predetermined level.

If Mode0 pin is in the predetermined level and Mode1 pin is not in the predetermined level, Step 602 is executed.

If Mode0 pin is not in the predetermined level and Mode 1 pin is in the predetermined level, Step 605 is executed.

If Mode0 pin and Mode1 pin are both in the predetermined level, specifically in high level, Step 609 is executed.

Specifically, level of Mode0 pin is generated by the first flag generating module in Embodiment 1 and level of Mode1 pin is generated by the second flag generating module in Embodiment 1.

Figure 7:
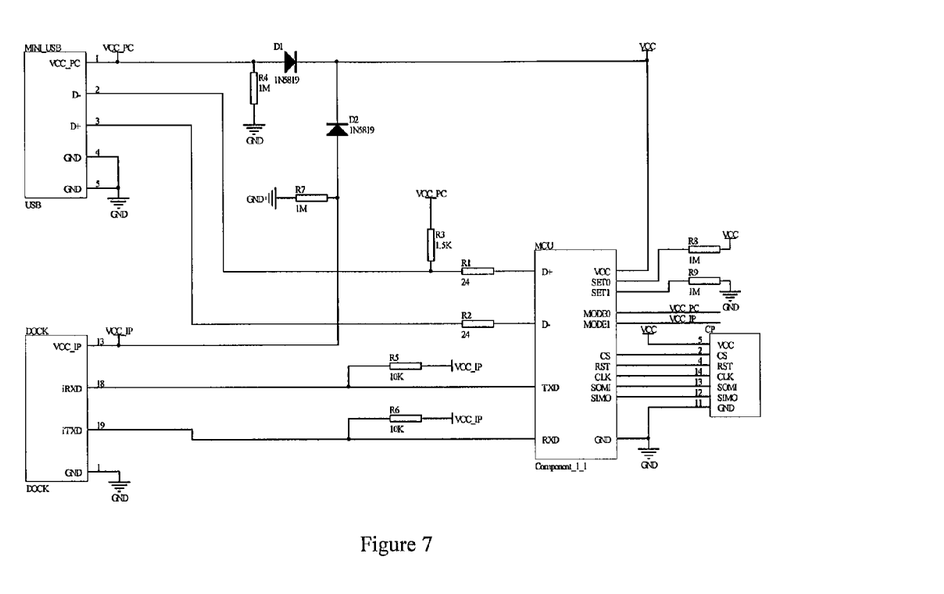
FIG. 7 illustrates another electric circuit diagram inside the USB Key provided by Embodiment 4 of the invention.

Preferably, as illustrated in the electric circuit diagram of FIG. 7, Mode0 pin connects to VCC-PC pin on MINI-USB interface, Mode 1 pin connects to VCC-IP pin on DOCK interface which functions as a serial interface, and correspondingly the predetermined level is high level.

If Mode0 pin connects to VCC-IP pin on DOCK interface which functions as the serial interface, mode1 pin connects to VCC-PC pin on MINI-USB interface, and correspondingly the predetermined level is a low level.

Correspondingly, the first flag generating module is accomplished by a connection between Mode0 pin on MCU and VCC-PC pin at MINI-USB interface, and the second flag generating module is accomplished by a connection between Mode1 pin on MCU and VCC-IP pin at DOCK interface.

Specifically, if VCC-PC is valid, the power level of Mode0 pin is in high level; or if VCC-PC is invalid, the power level of Mode0 pin is in low level; and if VCC-IP is valid, the power level of Mode1 pin is in high level, or if VCC-IP is invalid, the power level of Mode1 pin is in low level.

At the same time, MCU gets power supply from the power module provided in Embodiment 1, for example, as illustrated in the electric circuit diagram of FIG. 7, the power module includes two diodes D1 and D2, and a pull-down resistor R4.

Specifically, if Mode pin is in high level, viz., VCC-PC pin at MINI-USB interface is in high level, Diode D1 connecting to VCC-PC pin is conducted and MCU is powered up;

or if Mode pin is in low level, viz., VCC-IP pin at the DOCK interface is in high level, Diode D2 at the VCC-IP pin is conducted and MCU is powered up.

At the same time, in Embodiment 4, that D+ signal line is pulled up for high level is accomplished by the USB pull-up module in Embodiment 1.

Preferably, as illustrated in the electric circuit diagram of FIG. 7, the USB pull-up module is accomplished by a pull-up resistor R3 and VCC-PC pin of the flag generating module.

If the mode pin is in high level, VCC-PC pin at MINI-USB interface is in high level, and VCC-PC connecting to the pull-up resistor R3 is valid, so is the pull-up resistor R3, and as a result the signal line D+ is in high level.

At the same time, in Embodiment 4, preventing TXD pin and RXD pin from leakage is accomplished by the serial interface pull-up module in Embodiment 1.

Preferably, as illustrated in the electric circuit diagram of FIG. 7, the serial interface pull-up module is accomplished by pull-up resistors R5, R6 and VCC-IP.

Specifically, if mode pin is in low level viz., VCC-IP pin at DOCK interface is in high level, VCC-IP connecting to pull-up resistors R5 and R6 is valid, so are the pull-up resistors R5 and R6, which prevents TXD pin and RXD pin from leakage.

Step 602, MCU sets RXD pin and TXD pin to high impedance state, and terminates the serial interface function.

Step 603, MCU configures and enables the USB function.

Specifically, the method for configuring the USB function is the same as that applied in steps 203-206 of Embodiment 2, and thus details of it are eliminated.

Step 604, the Key receives a request for enumerating the device being initiated by the terminal, and communicates with the terminal via its USB interface after enumeration.

In Embodiment 4, the method for enumeration between the Key and the terminal is the same as that applied in Step 207 of Embodiment 2, and thus details of it are eliminated.

Step 605, MCU sets D+ pin and D− pin to high impedance state and terminates the USB function.

Step 606, MCU sets Port TXD to be an output port and sets Port RXD to be an input port.

Specifically, in Embodiment 4, the pull-up resistor on TXD signal line is optional, and if there is a pull-up resistor inside MCU, it is only necessary to configure Port TXD to be pulled up inside.

Step 607, MCU configures and enables the serial interface function.

In Embodiment 4, the method for configuring the serial interface function is the same as that applied in steps 210-213 of Embodiment 2, thus details of it are eliminated.

Step 608, the Key sends a request for enumerating the device to the terminal, and communicates with the terminal via its serial interface after enumeration.

Specifically, in Embodiment 4, the enumeration between the Key and the terminal is the same as those applied in Step 214 of Embodiment 2, thus details of it are eliminated.

Step 609, MCU ascertains communication privileges of all terminals connecting to Key, if the terminal connecting to the Key via the interface corresponding to the pin mode0 has a higher privilege, Step 602 is returned; if the terminal connecting to the Key via the interface corresponding to the pin mode 1 has a higher privilege, Step 605 is returned; or if the terminal connecting to the Key via the interface corresponding to the pin mode0 has the same privilege as the terminal connecting to the Key via the interface corresponding to the pin mode1, Step 610 is executed.

In details, in Embodiment 4, MCU ascertains the communication privilege of all terminals connecting to the Key by the privilege control unit of Embodiment 3.

Preferably, as illustrated in FIG. 7, the privilege control unit is accomplished by that SET0 pin inside MCU connects to the power pin VCC via a pull-up resistor R8 and SET1 pin connects to GND pin via a pull-down resistor R9.

SET0 pin is preconfigured to control a privilege of the terminal connecting to Key via an interface corresponding to Mode0 pin, SET1 PIN is preconfigured to control a privilege of the terminal connecting to Key via the interface corresponding to Mode1 pin.

Preferably, as illustrated in the electric circuit diagram of FIG. 7, SET0 pin connects to the power supply via a pull-up resistor, SET1 pin connects to the ground via a pull-down resistor, and thus the terminal connecting to the Key via the interface corresponding to Mode0 pin has a higher privilege and the terminal connecting to the Key via the interface corresponding to Mode1 pin has a lower privilege.

Correspondingly, if SET0 pin connects to the ground via the pull-down resistor and SET1 pin connects to the power supply via the pull-up resistor, the terminal connecting to the Key via the interface corresponding to Mode1 pin has a higher privilege and the terminal connecting to the Key via the interface corresponding to Mode0 pin has a lower privilege.

If SET0 pin and SET1 pin both are connected to the power supply via the pull-up resistor, or both are connected to the ground via the pull-down resistor, the terminal connecting to the Key via the interface corresponding to Mode1 pin has a same privilege as that terminal connecting to the Key via the interface corresponding to Mode0 pin.

Step 610, MCU configures the USB function and serial interface function, receives the request for enumerating the device being initiated by the terminal connecting to the USB interface, and sends a request for enumerating the device to the terminal connecting to the serial interface.

In Embodiment 4, the method for MCU to configure the USB function is the same as that described in Steps 203-206 of Embodiment 2, and thus details of it are eliminated. Also, the method for MCU to configure the serial interface function is the same as that described in Steps 210-213, and thus details of it are eliminated.

At the same time, the method for MCU to receive the request for enumerating the device being initiated by the terminal connecting to the USB interface is the same as that described in Step 207 of Embodiment 2, and thus details of it are eliminated.

The method for MCU to send the request for enumerating the device to the terminal connecting to the serial interface is the same as that described in Step 214 of Embodiment 2, and thus details of it are eliminated.

Step 611, MCU receives data.

Specifically, the process of receiving data is accomplished by the USB function unit and the serial interface function unit inside MCU of Embodiment 3.

Step 612, MCU sets a status flag.

Specifically, the status flag is set to be a first predetermined value after the USB function unit inside the MCU described in Embodiment 3, receives data being sent from the terminal connecting to the USB interface; or the status flag is set to be a second predetermined value after the serial interface function unit receives data being sent from the terminal connecting to the serial interface.

Preferably, in Embodiment 4, the first predetermined value is 0, and the second predetermined value is 1.

Step 613, MCU checks for the status flag, if it is the first predetermined value, Step 614 is executed; or if it is the second predetermined value, Step 615 is executed.

Preferably, in Embodiment 4, the checking for the status flag is completed by the processing unit inside MCU described in Embodiment 3 and the processing unit executes corresponding operation after the checking.

Step 614, MCU performs USB communication and returns to Step 611 after the communication ends.

Step 615, MCU performs serial interface communication and returns to Step 611 after the communication ends.

In Embodiment 4, it also can be predetermined that the terminal connecting to the Key via the interface corresponding to Mode1 pin has a same privilege as that terminal connecting to the Key via the interface corresponding to Mode0 pin, and thus MCU reports error and does not make any form of communication.

Steps described in the methods of Embodiments disclosed by the invention can be executed by hardware, software module being executed by a processor, or a combination of them. The software module can be installed on a RAM, a memory, a ROM, an EPROM, an EEPROM, a register, a hard disk, a portable disk, a CD-ROM, or in any other form of storage media well known in the prior art.

The above-mentioned are just preferred embodiments of the invention, but not a limit to the scope of protection of the invention, and any of those skilled in the art should appreciate that any modification and substitution in the scope of the technology disclosed in the invention should fall within the scope of protection of the invention. The scope of protection of the invention should be based on the claims of the invention.

The invention claimed is:

1. A universal serial bus line USB Key, wherein said USB key comprises an interface module, a power module and a micro control unit (MCU) module, wherein the interface module is configured to connect with a terminal;

the power module is configured to supply power to the MCU module in case that the interface module is connected with the terminal;

the MCU module is configured to perform initialization setting after power on, and detect power level status of a mode pin inside the MCU module, in case that the power level status conforms to a first predetermined condition, set a pin for serial interface communication in the MCU module to a high impedance state, configure a USB function, receive a request for enumerating a device being sent from the terminal connecting to the interface module, and perform USB communication with the terminal after enumeration; in case that the power level status conforms to a second predetermined condition, set a pin for USB communication in the MCU module to a high impedance state, configure a serial interface function, send a request for enumerating a device to the terminal connecting to the interface module, and perform a serial interface communication with the terminal after enumeration, in which the mode pin is configured to indicate a communication mode between the USB Key and the terminal by the power level status of the mode pin itself;

the mode pin comprises a first mode pin and a second mode pin;

the first predetermined condition refers to that the first mode pin is in a predetermined power level and the second mode pin is not in the predetermined power level; and the second predetermined condition refers to that the first mode pin is not in the predetermined power level and the second mode pin is in the predetermined power level;
the interface module comprises
a first interface module for connecting to the terminal via a USB interface, and
a second interface module for connecting to the terminal via a serial interface,
in which the first interface module comprises a first pin, and the second interface module comprises a second pin;
if the first interface module connects to the USB interface of the terminal, the first pin is in high power level, while if the second interface module connects to the serial interface of the terminal, the second pin is in high power level; and
if the first mode pin connects to the first pin and the second mode pin connects to the second pin, the predetermined level is high power level; while if the first mode pin connects to the second pin and second mode pin connects to the first pin, the predetermined level is low power level;
the terminal connecting to the first interface module is a USB terminal, and the terminal connecting to the second interface module is a serial-interface terminal; and
the MCU module is also configured to configured to ascertain communication privileges of the USB terminal and the serial-interface terminal in case that the first mode pin and the second mode pin both are in high power level, and if the USB terminal has a higher communication privilege than the serial interface terminal, set a pin for serial-interface communication in the MCU module to high impedance state, configure the USB function, and receive a request for enumerating a device being initiated by the USB terminal, and perform USB communication with the USB terminal after enumeration; while if the USB terminal has a lower communication privilege than the serial-interface terminal, set a pin for USB communication in the MCU module to high impedance state, configure the serial-interface function, send a request for enumerating a device to the serial interface terminal, and perform the serial-interface communication with the serial interface terminal after enumeration.

2. The USB Key of claim 1, wherein a number of the mode pin is 1;
the first predetermined condition refers to that the power level is a predetermined power level; and
the second predetermined condition refers to that the power level is not a predetermined power level.

3. The USB Key of claim 2, wherein the interface module comprises a first pin and a second pin, if the USB Key connects to a USB interface of the terminal, the first pin is in high power level and the second pin is in low power level; if the USB Key connects to a serial interface of the terminal, the first pin is in low power level and the second pin is in high power level; and
if the mode pin connects to the first pin, the predetermined power level is high power level; if the mode pin connects to the second pin, the predetermined power level is low power level.

4. The USB Key of claim 1, wherein the MCU module comprises a first setting pin and a second setting pin, and
the MCU module is configured to ascertain communication privileges of the USB terminal and the serial-interface terminal according to the power level status of the first setting pin and the second setting pin.

5. The USB Key of claim 1, wherein
the MCU module is configured to, if the USB terminal has the same communication privilege as the serial interface terminal, configure the USB function and the serial-interface function, receive a request for enumerating a device being initiated by the USB terminal, and after enumeration, perform USB communication with the USB terminal, and send the request for enumerating the device to the serial-interface terminal, and after enumeration, perform serial-interface communication with the serial-interface terminal.

6. The USB Key of claim 5, wherein the MCU module comprises
a USB function unit for receiving data being sent from the USB terminal, and setting a status flag to be a first predetermined value;
a serial-interface function unit for receiving data being sent from the serial-interface terminal, and setting the status flag to be a second predetermined value; and
a processing unit for checking for the status flag, and if the status flag refers to the first predetermined value, performing the USB communication with the USB terminal; while if the status flag refers to the second predetermined value, performing the serial-interface communication with the serial interface terminal.

7. A method for communication between a universal serial bus line USB Key and a terminal, wherein said method comprises such steps that
the USB Key powers up and performs initialization setting;
the USB Key detects power level of a mode pin in a micro-control unit (MCU) module of the USB Key itself, in which the mode pin is configured to indicate communication mode between the USB Key and the terminal by power level of the mode pin itself;
if the power level of the mode pin conforms to a first predetermined condition, the USB Key sets a pin for serial-interface communication in the MCU module to a high impedance state, configures a USB function, receives a request for enumerating a device being initiated by the terminal connecting to the USB Key, and after enumeration, performs the USB communication with the terminal;
if the power level of the mode pin conforms to a second predetermined condition, the USB Key sets a pin for USB communication in the MCU module to a high impedance state, configures a serial-interface function, sends a request for enumerating the device to the terminal connecting to the USB Key, and performs the serial-interface communication with the terminal after enumeration;
the mode pin comprises a first mode pin and a second mode pin,
the first predetermined condition refers to that the first mode pin is in predetermined power level, and the second mode pin is not in the predetermined power level; and
the second predetermined condition refers to that the first mode pin is not in predetermined power level, and the second mode pin is in predetermined power level;
a first interface module of the USB Key connects to the terminal via the USB interface and comprises a first pin;
a second interface module of the USB Key connects to the terminal via the serial interface and comprises a second pin;
if the first interface module connects to the USB interface of the terminal, the first pin is in high power level, while if the second interface module connects to the serial interface module of the terminal, the second pin is in high power level; and if the first mode pin connects to the first pin and the second mode pin connects to the second pin, the predetermined level is high power level; while if the first mode pin connects to the second pin and the second mode pin connects to the first pin, the predetermined level is low power level;

the terminal connecting to the first interface module is a USB terminal, and the terminal connecting to the second interface module is a serial interface terminal;

after the USB Key detects the power level of the mode pin in the MCU module of the USB Key itself, the method further comprises that if the first mode pin and the second mode pin are both in high power level, the USB Key ascertains communication privileges of the USB terminal and the serial-interface terminal;

if the USB terminal has a higher communication privilege than the serial-interface terminal, the USB Key sets a pin for the serial-interface communication in the MCU module to the high impedance state, configures the USB function, receives a request for enumerating a device being initiated by the USB terminal, and after enumeration, performs the USB communication with the USB terminal; and if the USB terminal has a lower communication privilege than the serial interface terminal, the USB Key sets a pin for USB communication in the MCU module to the high impedance state, configures the serial-interface function, sends a request for enumerating a device to the serial-interface terminal, and after enumeration, performs the serial interface communication with the serial interface terminal.

8. The method of claim 7, wherein a number of the mode pin is 1, the first predetermined condition refers to that the power level is the predetermined power level; and the second predetermined condition refers to that the power level is not the predetermined power level.

9. The method of claim 8, wherein an interface module of the USB Key comprises a first pin and a second pin, and if the USB Key connects to a USB interface of the terminal, the first pin is in high power level and the second pin is in low power level; while if the USB Key connects to a serial interface of the terminal, the first pin is in low power level and the second pin is in high power level; and if the mode pin connects to the first pin, the predetermined power level is high power level, while if the mode pin connects to the second pin, the predetermined power level is low power level.

10. The method of claim 7, wherein the MCU module comprises a first setting pin and a second setting pin;

that the USB Key ascertaining communication privileges of the USB terminal and the serial interface terminal comprises that the USB Key ascertains communication privileges of the terminals respectively corresponding to the first setting pin and the second setting pin according to the power level of the first setting pin and the power level of the second setting pin.

11. The method of claim 7, wherein after the USB Key ascertains the communication privileges of the USB terminal and the serial interface terminal, the method further comprises that if the USB terminal has the same communication privilege as the serial interface terminal, the USB Key configures the USB function and the serial interface function, receives a request for enumerating a device being initiated by the USB terminal, and after enumeration, performs the USB communication with the USB terminal; and sends a request for enumerating a device to the serial interface terminal, and after enumeration, performs the serial interface communication with the serial-interface terminal.

12. The method of claim 11, wherein that the USB Key performs the USB communication with the USB terminal or performs the serial-interface communication with the serial-interface terminal comprises that upon receiving data being sent from the USB terminal, the USB Key sets the status flag to be a first predetermined value, or upon receiving data being sent from the serial-interface terminal, the USB Key sets the status flag to be a second predetermined value; and the USB Key checks for the status flag, if the status flag refers to the first predetermined value, the USB Key performs the USB communication with the USB terminal, or if the status flag refers to the second predetermined value, the USB Key performs the serial-interface communication with the serial-interface terminal.

* * * * *